United States Patent
Cohen Kassko et al.

(10) Patent No.: US 9,965,772 B2
(45) Date of Patent: May 8, 2018

(54) SYSTEM AND METHOD FOR UNIFYING USER-LEVEL DATA ACROSS DIFFERENT MEDIA PLATFORMS

(71) Applicant: Datorama Technologies, Ltd., Tel-Aviv (IL)

(72) Inventors: Efraeim Cohen Kassko, Herzeliya (IL); Ran Sarig, Tel Aviv (IL)

(73) Assignee: Datorama Technologies, Ltd., Tel-Aviv (IL)

(*) Notice: Subject to any disclaimer, the term of this patent is extended or adjusted under 35 U.S.C. 154(b) by 11 days.

(21) Appl. No.: 14/807,995

(22) Filed: Jul. 24, 2015

(65) Prior Publication Data

US 2015/0332316 A1 Nov. 19, 2015

Related U.S. Application Data

(63) Continuation-in-part of application No. 14/077,951, filed on Nov. 12, 2013.

(60) Provisional application No. 61/752,594, filed on Jan. 15, 2013.

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0242* (2013.01); *G06Q 30/0243* (2013.01); *G06Q 30/0255* (2013.01)

(58) Field of Classification Search
CPC .............. G06F 17/30867; G06Q 30/02; G06Q 30/0269; G06Q 30/0273

USPC ............ 705/14.1, 14.4, 14.41, 14.45, 14.53, 705/14.66, 14.73
See application file for complete search history.

(56) References Cited

U.S. PATENT DOCUMENTS

| | | | | | |
|---|---|---|---|---|---|
| 5,877,759 A | * | 3/1999 | Bauer | ................... | G06Q 10/06 707/999.01 |
| 5,892,905 A | * | 4/1999 | Brandt | ................... | H04L 63/02 709/202 |
| 5,920,700 A | * | 7/1999 | Gordon | ................. | G06F 3/0607 709/226 |
| 5,979,757 A | * | 11/1999 | Tracy | ..................... | G06K 17/00 186/56 |
| 6,006,171 A | * | 12/1999 | Vines | ..................... | G05B 15/02 702/184 |

(Continued)

FOREIGN PATENT DOCUMENTS

EP 0697669 A2 * 2/1996 ........... G06Q 10/087

*Primary Examiner* — Luis A Brown
(74) *Attorney, Agent, or Firm* — M&B IP Analysts, LLC

(57) ABSTRACT

A system and method for unifying user-level data across a plurality of media platforms are provided. The method includes receiving user-level data events from the plurality of media platforms, wherein each event relates to at least one online advertisement viewed by a plurality of users; processing the received user-level data events to detect a group of user-level data events related to the same user of the plurality of users; combining user-level data from each group of user-level data events related to the same user; assigning a unique user identifier to the combined user-level data to result in a unified user-level data related to a particular user; and storing the unified user-level data in a database, thereby providing consistent user-level data across the plurality of media platforms.

13 Claims, 6 Drawing Sheets

(56) References Cited

U.S. PATENT DOCUMENTS

| | | | | |
|---|---|---|---|---|
| 6,023,766 A * | 2/2000 | Yamamura | | G06F 21/105 705/59 |
| 7,003,560 B1 * | 2/2006 | Mullen | | G06Q 10/06 709/223 |
| 7,275,024 B2 * | 9/2007 | Yeh | | G06F 17/30592 703/13 |
| 7,421,427 B2 * | 9/2008 | DeForeest | | G06F 17/30893 |
| 7,647,298 B2 * | 1/2010 | Adya | | G06F 17/30418 707/999.002 |
| 7,657,516 B2 * | 2/2010 | Zaman | | G06F 17/30592 707/999.004 |
| 7,747,608 B1 * | 6/2010 | Gheorghe | | G06F 17/30592 707/713 |
| 7,814,139 B2 * | 10/2010 | Singh | | G06Q 20/20 705/16 |
| 8,676,628 B2 * | 3/2014 | Martignoni | | G06Q 30/02 705/7.29 |
| 8,725,597 B2 * | 5/2014 | Mauseth | | G06Q 10/10 705/28 |
| 9,183,272 B1 * | 11/2015 | Jonsson | | G06F 17/30418 |
| 9,508,082 B1 * | 11/2016 | Mannix | | G06Q 30/0201 |
| 2007/0061318 A1 * | 3/2007 | Azizi | | G06F 17/30386 |
| 2010/0088177 A1 | 4/2010 | Lu et al. | | |
| 2011/0246267 A1 * | 10/2011 | Williams | | G06Q 30/02 705/14.4 |
| 2011/0258049 A1 * | 10/2011 | Ramer | | G06F 17/30867 705/14.66 |
| 2011/0302025 A1 | 12/2011 | Hsiao et al. | | |
| 2012/0010933 A1 | 1/2012 | Satyavolu et al. | | |
| 2012/0054143 A1 | 3/2012 | Doig et al. | | |
| 2012/0130942 A1 * | 5/2012 | Dipper | | G06F 17/30436 707/602 |
| 2013/0124653 A1 | 5/2013 | Vick et al. | | |
| 2014/0200988 A1 | 7/2014 | Kassko et al. | | |
| 2014/0200989 A1 | 7/2014 | Kassko et al. | | |

* cited by examiner

SYSTEM AND METHOD FOR UNIFYING USER-LEVEL DATA ACROSS DIFFERENT MEDIA PLATFORMS

CROSS-REFERENCE TO RELATED APPLICATIONS

This application is a continuation-in-part (CIP) of U.S. patent application Ser. No. 14/077,951 filed on Nov. 12, 2013, now pending, which claims the benefit of U.S. provisional patent application No. 61/752,594 filed Jan. 15, 2013, the contents of which are incorporated herein by reference.

TECHNICAL FIELD

The present disclosure relates generally to harnessing big data gathered from multiple data sources, and more particularly to analytic measurements across multiple data sources.

BACKGROUND

Techniques for collecting, managing, and providing real-time or near real-time relevant information have been enhanced through the use of the Internet and online research and information collection tools. One such set of tools is known as web analytics. Web analytics focuses on a company's own website for collection of online information, particularly traffic data. Web analytics are limited in that they only consider a subset of the relevant online universe, specifically the behavior of users of a given website.

Other analytics tools try to learn and predict the exposure and reach of advertisements displayed on websites, including social media websites. These tools gather statistics related to the reach and exposure of the advertisements. The statistics may include the number of impressions, URLs of webpages displaying the advertisements, geographical locations of users that watched the advertisements, click-through rate of advertisements, the period of time that each viewer watched the advertisements, and so on.

Currently, every ad-serving company as well as each social media website independently gathers its own statistics and analytics with regard to the exposure and reach of advertisements. However, campaign managers who like to have better understanding about the reach of advertisements and whether their budget was well spent have limited tools by which to do so. As a result, campaign managers cannot efficiently analyze and understand the performance of an advertisement campaign.

Specifically, the information gathered by a single ad-serving company or a social website per campaign may include trillions of records. Multiplying these by different companies serving the same campaigns makes it almost impossible for campaign managers to analyze the gathered information using existing tools. Further, in addition to the volume of the gathered information, each ad-serving company presents the gathered statistics using a different format. This further increases the complexity of the campaign analysis.

It should be noted that failing to efficiently and accurately analyze the performance of an advertising campaign results in revenue losses for businesses, as their advertising budget is not being efficiently spent.

Additionally, existing user level database solutions typically utilize cookies (or any type of identifiers) received from each ad-serving company (such as, e.g., a social media website, ad-serving systems, and the like) to determine user identities. Each ad-serving company or website normally uses its own unique identifier (user ID) to mark the end user. As a result, it is probable that the same end-user accessing advertisements via multiple ad-serving companies and/or social media websites can be mapped to numerous users in the user level database. This multiple mapping can create misleading data, thereby resulting in loss of information or conspicuous inconsistencies in data.

As an example, a user may view an advertisement for Coca Cola® on both Facebook® and Twitter®. The Coca Cola® company may wish to determine the reach of its advertising campaign by determining how many users viewed its campaigns across various media platforms. With respect to this user, Facebook® and Twitter® have stored different user IDs (e.g., in a form of cookies) for the same user. When Coca Cola® seeks to generate a user level database to track how many people have viewed its advertising campaign, that user may be marked in the user level database twice. When this scenario occurs respective of many users, the data ceases to be truly reflective of the number of people who actually viewed the campaign.

Moreover, the inconsistency in the application level user data would prevent campaign managers from deriving accurate and meaningful analytics respective of their campaigns. For example, post-impression or post-conversion data can be analyzed. As another example, campaign managers cannot properly assess the effectiveness of each of the media platform campaign running the campaign.

It would therefore be advantageous to provide a solution that would overcome the deficiencies of the prior art by generating unified user level data across a variety of different media platforms.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosure relates in various embodiments to a method for unifying user-level data across a plurality of media platforms. The method comprises: receiving user-level data events from the plurality of media platforms, wherein each event relates to at least one online advertisement viewed by a plurality of users; processing the received user-level data events to detect a group of user-level data events related to the same user of the plurality of users; combining user-level data from each group of user-level data events related to the same user; assigning a unique user identifier to the combined user-level data to result in a unified user-level data related to a particular user; and storing the unified user-level data in a database, thereby providing consistent user-level data across the plurality of media platforms.

The disclosure relates in various embodiments to a system for unifying user-level data across a plurality of media platforms. The system comprises: a processor; and a memory, the memory containing instructions that, when executed by the processor, configure the system to: receive user-level data events from the plurality of media platforms, wherein each event relates to at least one online advertisement viewed by a plurality of users; process the received user-level data events to detect a group of user-level data events related to the same user of the plurality of users; combine user-level data from each group of user-level data events related to the same user; assign a unique user identifier to the combined user-level data to result in a unified user-level data related to a particular user; and store the unified user-level data in a database, thereby providing consistent user-level data across the plurality of media platforms.

The disclosure relates in various embodiments to a system for tracking users across a plurality of media platforms. The system comprises: a unified tracking module for generating unified user-level data of each user across the media of advertising platforms; a database configured to store the unified user-level data generated each user; a trafficking manager configured to provide a pixel trafficking service by tapping into the plurality of advertising platforms; and a data aggregator configured to receive raw data from the unified tracking module.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
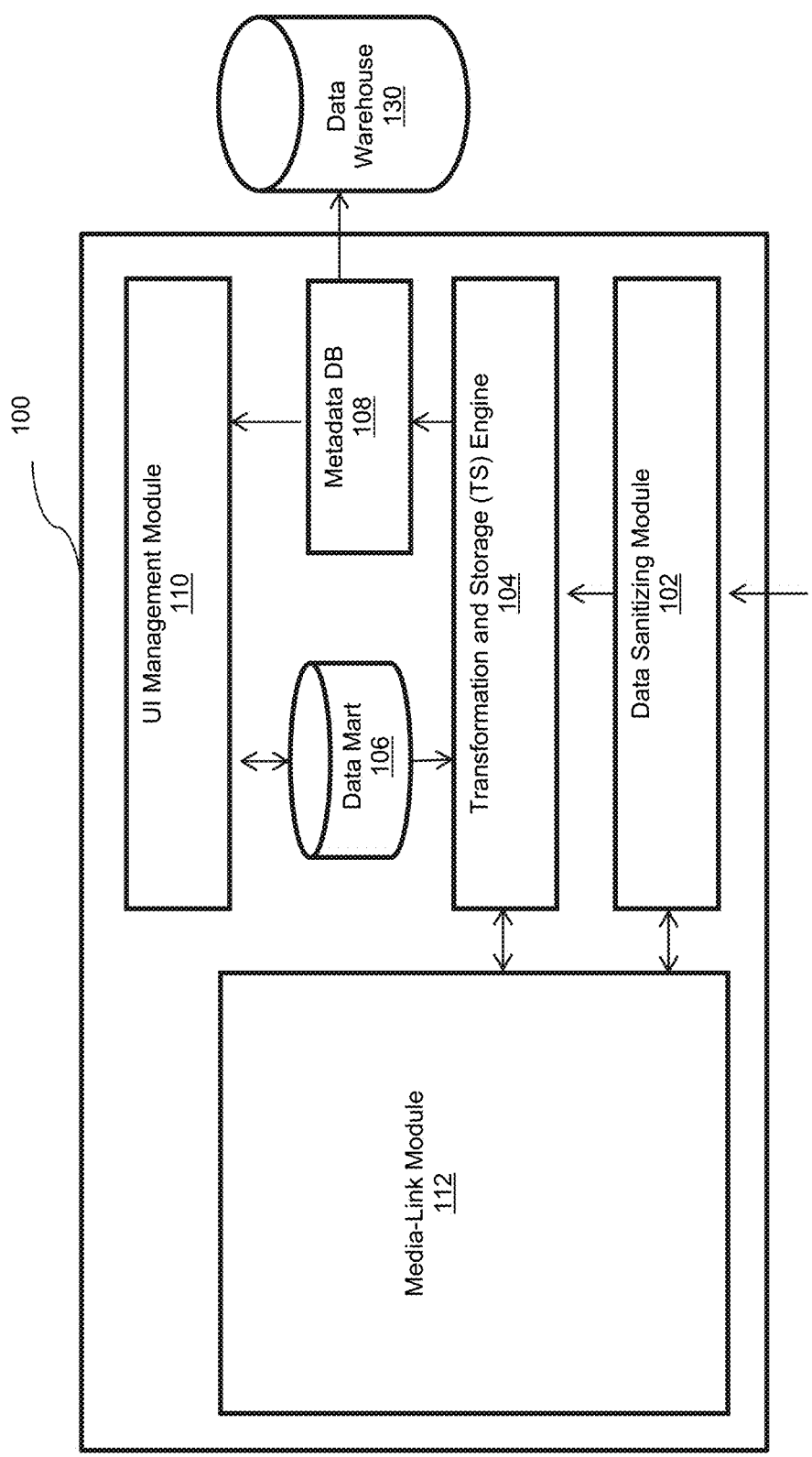
FIG. 1 is a schematic block diagram of a system for cross-platform big data analytics utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting block diagram of a system 100 for cross-platform big data analytics utilized to describe the various embodiments. The system 100 includes a data sanitizing module 102, a transformation and storage (TS) engine 104, a data mart module 106, a metadata database (DB) 108, a management user interface (UI) module 110, and a media-link module 112.

The data sanitizing module 102 is configured to load data into the system 100 and to produce a dataset normalized to a predefined unified format. That is, regardless of the format or the type of the input data, the output of the data sanitizing module 102 is a data set in a unified format. The input data uploaded to the data sanitizing module 102 may be, but is not limited to, unstructured data, structured data, standardized data (e.g., Excel, XML, etc.), and so on.

The data sanitizing module 102 is configured to support both push and pull operations facilitated through a plurality of data transfer protocols. Such protocols include, for example, FTP, SFTP, FTPS, HTTP, HTTPS, SMTP, POP3, and the like. According to one embodiment, the data sanitizing module 102 is also configured to decrypt the data if such data is received in an encrypted form. The decryption keys are provided by the entity owning the data.

In another embodiment, the data sanitizing module 102 is configured to identify and associate the incoming data with the entity owning the data. Such an entity may be, for example, a public relations enterprise running the advertisement campaign, an advertising agency, a campaign manager, and so on. The processing of the data identification and its corresponding association is required in order to ensure the security of such data in the system 100. That is, the processing is required to ensure that data related to one entity is not shared with or utilized by other entities using the system 100.

In one embodiment, the data sanitizing module 102 includes a scheduler (not shown) configured to pull data from pre-integrated API-based data sources. The data sanitizing module 102 may further include a listener (not shown) for determining if the data is ready to be uploaded to the system 100. The listener is configured to perform any one of the file transfer protocols supported by the data sanitizing module 102 such as, e.g., FTP, SFTP, FTPS, HTTP, HTTPS, SMTP, POP3, and the like.

The TS engine 104 is a non-transitory data repository for the normalized data provided by the data sanitizing module 102 or the media-link tracking and media-link module 112. The TS engine 104 is configured to transform the normalized dataset into a relaxed user-specific data schema. The relaxed data schema includes the data types, dimensions, metric definition, hierarchy, and aggregation function for each metric. Thereafter, the TS engine 104 is configured to execute a data transformation process to transform data values in the dataset to meet the relaxed data schema. The data transformation is performed by a plurality of transformation rules. This transformation results in a dataset (hereinafter the "relaxed dataset") that includes relevant data gathered from multiple platforms, organized according to the relaxed data schema as specified by the user.

The TS engine 104 is further configured to analyze the relaxed dataset to compute various campaign measurements of measurable data items included in the relaxed dataset. The analysis performed by the TS engine 104 includes data aggregation, and analytical as well as statistical calculations. For example and without limitation, the statistical measurements for each such data item include an average, a normal distribution, a maximum value, a minimum value, an absolute value, and so on. A measurable data item is any item that that can be aggregated. For example, currency values, conversion rates, a number of hits, a number of clicks, a number of fans, a number of page views, and a number of leads are merely a few examples of measurable data items.

In accordance with another embodiment, the various measurements are generated with respect to one or more campaign objectives defined by the user or preconfigured in the system 100. For example, if the campaign objective is to reach 100,000 fans in a social network, the TS engine 104 is configured to compute the current number of fans and the rate of new fan acquisition, and predict whether the campaign objective can be met and when. Finally, the TS engine 104 is configured to populate the analyzed data and/or the resulting dataset into the data-mart module 106. It should be noted that the aggregation of the calculation performed by the TS engine 104 allows retrieving the processed information by the UI module 110 without latency. That is, the dataset is preprocessed without waiting for a specific query. The various processes performed by the TS engine 104 are discussed in greater detail with reference to FIG. 2.

In one embodiment, the data saved in the data-mart module 106 is optimized for providing fast access to the data. This allows producing reports, answering queries, and/or receiving the relevant portions of the aggregated data on the fly without any delay. The data mart module 106 is optimized for high concurrency, scalability and availability.

In another embodiment, the TS engine 104 is also configured to store the data mapped to the destination schema in the data warehouse 130 for later usage. This may include, for example, custom querying, service-based analysis (e.g., analysis performed by a Data Scientist team) and re-processing of the stored data.

The data warehouse 130 may be communicatively connected to the system 100 or integrated therein. The data warehouse 130 is accessed through the data mart module 106 which is configured to allow accelerated retrieval of the aggregated data stored in the data warehouse 130. In one embodiment, the data-mart module 106 is realized as a data structure server.

The metadata DB 108 is configured to store and maintain metadata utilized by the system 100, and in particular by the TS engine 104 for processing and analyzing of campaign data. The metadata DB 108 may be integrated in the system 100 (as shown in FIG. 1) or communicatively connected thereto. In one embodiment, the metadata DB 108 is realized as an online transaction processing (OLTP) database which is configured to support the various processes performed by the system 100.

The management UI module 110 is configured to provide access to the system 100 from various client devices. The client devices may include, for example, a PC, a smart phone, a tablet computer, and the like. The communication with the management UI module is facilitated through an application executed over the client device; such an application may include a web browser. In one embodiment, the management UI module 110 implements a set of application programming interfaces (API) to allow communication with the client device.

In an embodiment, the TS engine 104 can analyze data provided by the data sanitizing module 102, where such data is typically loaded into the system 100 "off-line". That is, the data sources connected to the module 102 provide data as gathered, over time, from different advertising platforms. As such, the data sources are adapted to upload or "push" data to the system 100 as the campaign analytics are published by each respective advertising platform.

According to another embodiment, the TS engine 104 can analyze "real-time" data collected by the media-link module 112 with regard to one or more online campaigns. The media-link module 112 is configured to tap into advertising platforms and to track their entire media plans. The media plan is typically defined by a media agency and entails media platforms for the campaign. The media plan is designed to find the specific combination of media to best achieve the marketing campaign objectives.

Therefore, the media-link module 112 is also configured to gather other data related to advertising campaigns in real time, when such data is published and/or collected by an advertising platform. The data gathered by the media-link module 112 is input to the data sanitizing module 102. An advertising platform may be an ad-serving system of an ad-serving company, a social media website, a content publisher, and the like. Various components of a typical media-link module 112 are described further herein below with respect to FIG. 3.

Each, some, or all of the modules of the system 100 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
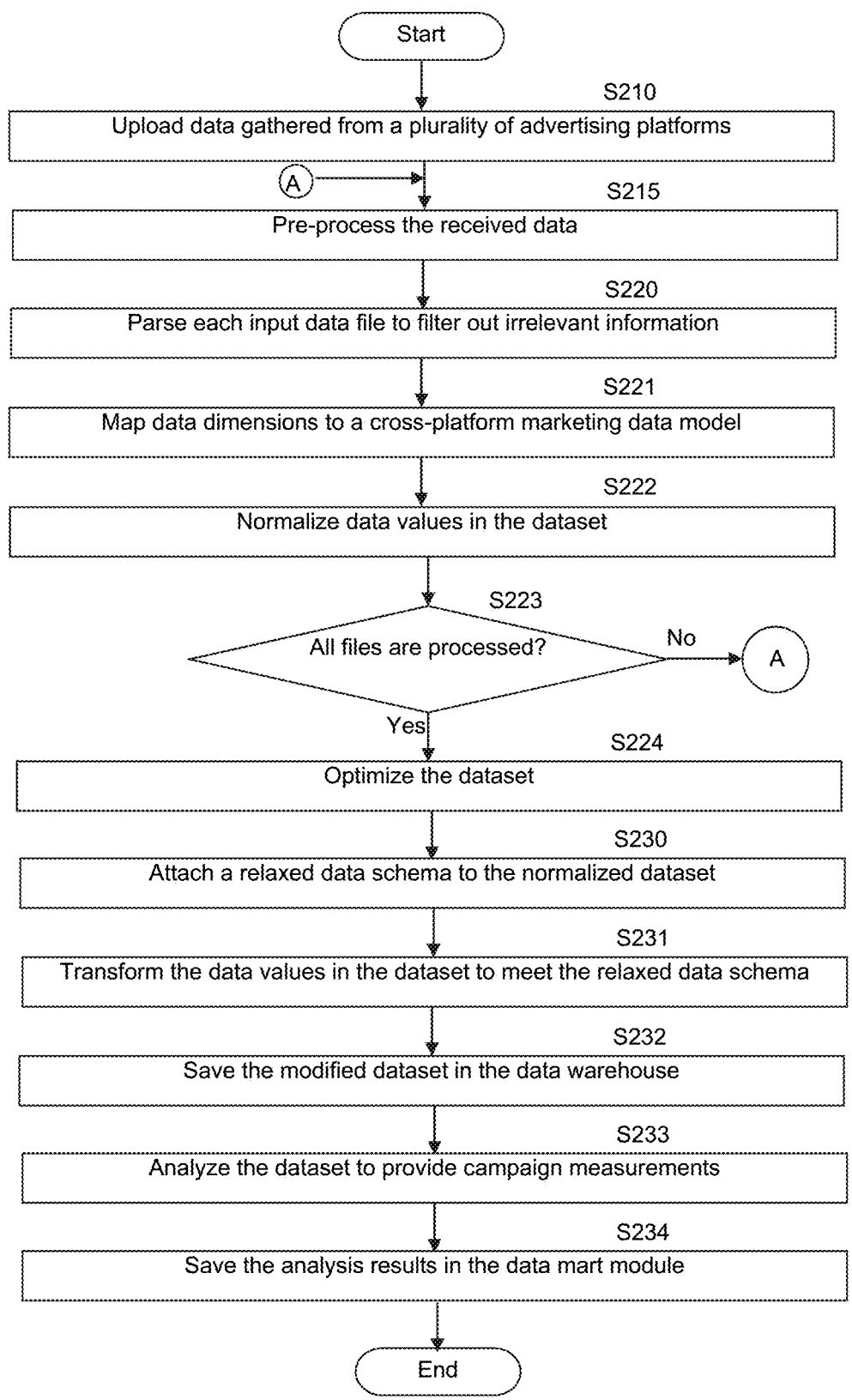
FIG. 2 is a flowchart illustrating a method for providing cross-platform analytics according to one embodiment.

FIG. 2 shows an exemplary and non-limiting flowchart 200 illustrating a method for providing cross-platform analytics using the system demonstrated in FIG. 1. The method is performed by the data sanitizing module 102 and TS engine 104 of the system 100.

At S210, data gathered by a plurality of advertising platforms regarding one or more advertising campaigns is uploaded to the data sanitizing module 102. The uploaded data may be received from ad-serving companies, social media websites, advertisement agencies, and the like. The received data may be provided to the data sanitizing module 102 in either pull or push operation modes.

As noted above, the data sanitizing module 102 supports a plurality of protocols for communication with the data sources and platforms for receiving data. In one embodiment, input data may be in any data format, such as structured, unstructured, and standardized (e.g., Excel, XML, and the like). For the sake of simplicity and without limiting the scope of the disclosed embodiments, the data may be uploaded in the form of files.

Optionally, at S215 the received data is pre-processed. This pre-processing includes, but is not limited to, decryption of data received in an encrypted form. With this aim, the data sanitizing module 102 is configured to maintain or receive over a secured connection the relevant encryption keys from the data owner. In one embodiment, S215 further includes identification and association of each input data file with its respective data owner entity.

At S220, each input data file is parsed to filter out irrelevant information contained in the file. As a non-limiting example, an Excel file is parsed to identify blank rows and to remove such rows from the file. As another non-limiting example, headers and commentary information are filtered out as well.

At S221, data dimensions (fields) in the input file are mapped to a cross-platform marketing data model. This cross-platform marketing data model is designed according to the disclosed embodiments to support marketing and analytical metrics of online advertising. In an exemplary embodiment, the cross-platform marketing data model defines at least a date dimension and at least one metric dimension. The at least one metric dimension may be predefined in the system 100 and customized by the user. Examples for such metric dimensions include, but are not limited to, impression counts, click counts, conversion, media cost, placement, and so on. The data model may also define dimensions such as currency, geographical location, campaign name, a default value, and the like. The cross-platform marketing data model further defines the relationship between objects, their hierarchies, their data type, and their format. It should be noted that the system 100 may be preprogrammed with the cross-platform marketing data model which may be further customized by a user of the system.

The mapping of dimensions (fields) in the input file to the cross-platform marketing data model includes analyzing the input file to determine a data type of each field and field name, matching between a source field name and a dimension in the model based in part on the data type and the field name. For example, if a source field name in the input file is "clicks", the source field name can be mapped to a metric dimension "delivery clicks" in the predefined data model. The mapping is performed for each dimension or for a predefined set of dimensions in the input file. Data entries that cannot be mapped to the dimensions in the cross-platform marketing data model are placed in the default value dimensions. The result of S221 is a dataset being organized and functioning as defined in the cross-platform marketing data model.

At S222, data values in the dataset are normalized to be represented in a unified notation. In one embodiment, data values of common data dimensions are normalized. For example, common data dimensions are related to data entries likely to appear in most of the files input to the data sanitizing module 102. Examples for common data dimensions include, but are not limited to, date, currency, country, zip code, and so on. The data normalization may include, for example, representing a date dimension (field) in a notation of 'MM/DD/YYYY', converting currency to USD (using a current exchange rate), representing a country code using 2 characters, and so on. The unified notation is determined by the format of the respective dimension as defined in the cross-platform marketing data model. The result of S222 is a normalized dataset being organized and functioning as defined in the cross-platform marketing data model.

At S223, a check is made to determine if all input files have been processed and, if so, execution continues with S224; otherwise, a new input file is selected and execution returns to S215. The execution reaches S224 when data contained in all the input files are aggregated in the normalized dataset and organized to function as defined in the cross-platform marketing data model. At S224, the normalized dataset is further optimized to allow faster manipulation of the data. In one embodiment, the optimization includes saving the dataset in a column-based format. It should be noted that, during the manipulation and organization of input data files, data is saved in a storage device, which may be a database, the data warehouse 130, and the like.

At S230, a relaxed data schema is attached to the normalized dataset. The relaxed data schema includes data types, dimensions, metric definitions, a hierarchy of data fields, and an aggregation function for each metric. In an embodiment, the relaxed data schema determines how data values from the normalized dataset will be read and manipulated. The relaxed data schema is user-specific, i.e., it is defined based on the user's requirements.

At S231, data values in the normalized dataset are transformed to comply with the relaxed data schema. The data transformation is performed by means of a plurality of transformation rules. A transformation rule defines at least one of the following actions to be performed on the data: alteration, classification, and segmentation. For example, the segmentation rule may define that all impressions counted during a weekend will be grouped together. As another example, personal information recorded in one record in the following notation: 'first-name_last-name_age_gender' is expanded into different individual attributes, such as 'first name', 'last name', 'age', and 'gender'. This allows aggregating and performing analytic functions on each attribute individually. The system 100 through the UI management module 110 allows the user to define transformation rules. S231 results in a modified dataset that meets the definitions of the relaxed data schema. At S232, the data transformed to comply with the relaxed data schema is saved in the data warehouse 130 for later usage.

At S233, the modified dataset is analyzed to provide measurements on the aggregated data. In one embodiment, the analysis includes aggregation and analytical calculations across all measurable data items in the modified dataset and/or with respect to campaign objectives. The statistical measurements include, but are not limited to, an average, a normal distribution, a maximum value, a minimum value, an absolute value, and so on. A measurable data item is any item that can be aggregated. For example, currency values, conversion rates, a number of hits, a number of clicks, a number of fans, a number of page views, and a number of leads are merely a few examples for measurable data items. Additional examples are provided above.

At S234, the results of the analysis are saved in the data-mart module 106. That is, the computed measurements are saved as part of the dataset or in association with the dataset. The data-mart module 106 is configured to adapt the data received from the TS engine 104 into a format that is accessible and query-able by the UI management module 110.

Figure 3:
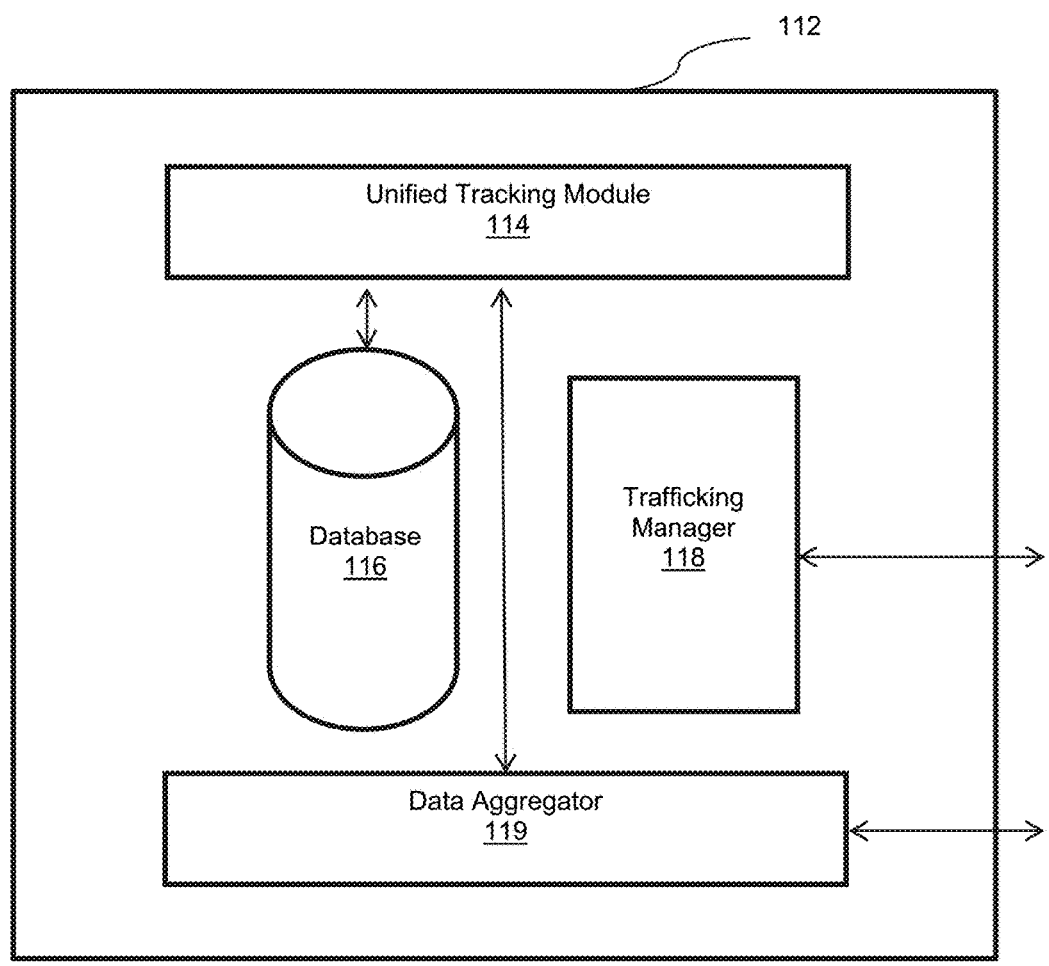
FIG. 3 is a schematic block diagram of a media-link module implemented according to one embodiment.

FIG. 3 is an exemplary and non-limiting schematic block diagram of a media link module 112 implemented according to one embodiment. In an exemplary implementation, the media link module 112 includes a unified tracking module 114, a database 116, a trafficking manager 118, and a data aggregator 119.

In an embodiment, the unified tracking module 114 provides pixel tracking services for mapping users of different media platforms. Examples for such platforms include, but are not limited to, social media channels (or websites), webpages, ad-serving systems, customer relationship management (CRM) systems, and the like. The unified tracking module 114 is further configured to provide unified user tagging across the different media platforms. In an embodiment, the unified tracking module 114 handles HTTP/HTTPS calls generated by client devices. Each client device (or user) is assigned a unique user-ID and the device's activity is logged in the unified tracking server's 114 log file. Thereafter, those log files are loaded to the TS engine 104. Users of client devices include viewers viewing advertisements displayed on webpages, mobile applications, online games, and the like.

The database 116 is configured to store a server side data-structure. In one embodiment, the server side data-structure is an extension of an HTTP cookie mechanism. In another embodiment, the server side data-structure is utilized as an HTTP cookie mechanism in environments that do not support such cookies (e.g., IPTV, Mobile). The database 116 stores the unified user-level data which is in a persistent user state in a scalable manner.

The trafficking manager 118 is configured to perform a pixel trafficking service that taps into the different media platforms, and in particular ad-serving systems, to enable tracking of their media plans. A tracking pixel is a tag installed or placed in an advertising platform. The tag may be in a form of an HTML tag, a JavaScript file, and the like. The tracking pixel calls upon another service to provide the media-link module 112 with analytics information gathered from the advertising platform.

In one embodiment, the trafficking manager 118 included in the media link module 112 allows for automatically placement of a proprietary tracking tag on top of an existing media plan on various ad-serving platforms. This allows combining user level data from multiple ad-serving platforms.

In a non-limiting embodiment, the trafficking manager 118 is configured to connect to a media platform (e.g., an ad-serving server) through an API, extract the media plan, and learn the different entities of the extracted media plan. Then, the extracted media plan is mapped to a predefined media plan structure utilized by the system 100. Once the trafficking manager 118 learns the structure of the extracted media plan, the trafficking manager 118 is configured to create conversion tags and to update the media plan of the respective platform to call up the proprietary conversion tags (e.g., through the API).

In an embodiment, the trafficking manager 118 dynamically learns of the changes made in the media plans of previously tagged advertising media platforms. With this aim, the trafficking manager 118 is configured to periodically connect to the advertising media platforms, and for each platform, the trafficking manager 118 is configured to compare its existing snapshot of the media plan with a current media plan of a respective platform and to make the necessary adjustments.

The data aggregator 119 is configured to receive raw data from the unified tracking server 114. The raw data may be in a serialized and optimized data format. The data aggregator 119 is configured to validate and aggregate the raw data into multiple aggregations and analytical computations, such as summing up events per hour per location, calculating overlap between different channels, and so on. The aggregated data is input to a data sanitizing module (e.g., the data sanitizing module 102). In one embodiment, the data processed by the data aggregator 119 can be stored for future usage, such as custom querying and data analytics services.

Each, some, or all of the elements of the media-link module 112 may be realized by a processing system. The processing system may comprise or be a component of a larger processing system implemented with one or more processors.

Figure 4:
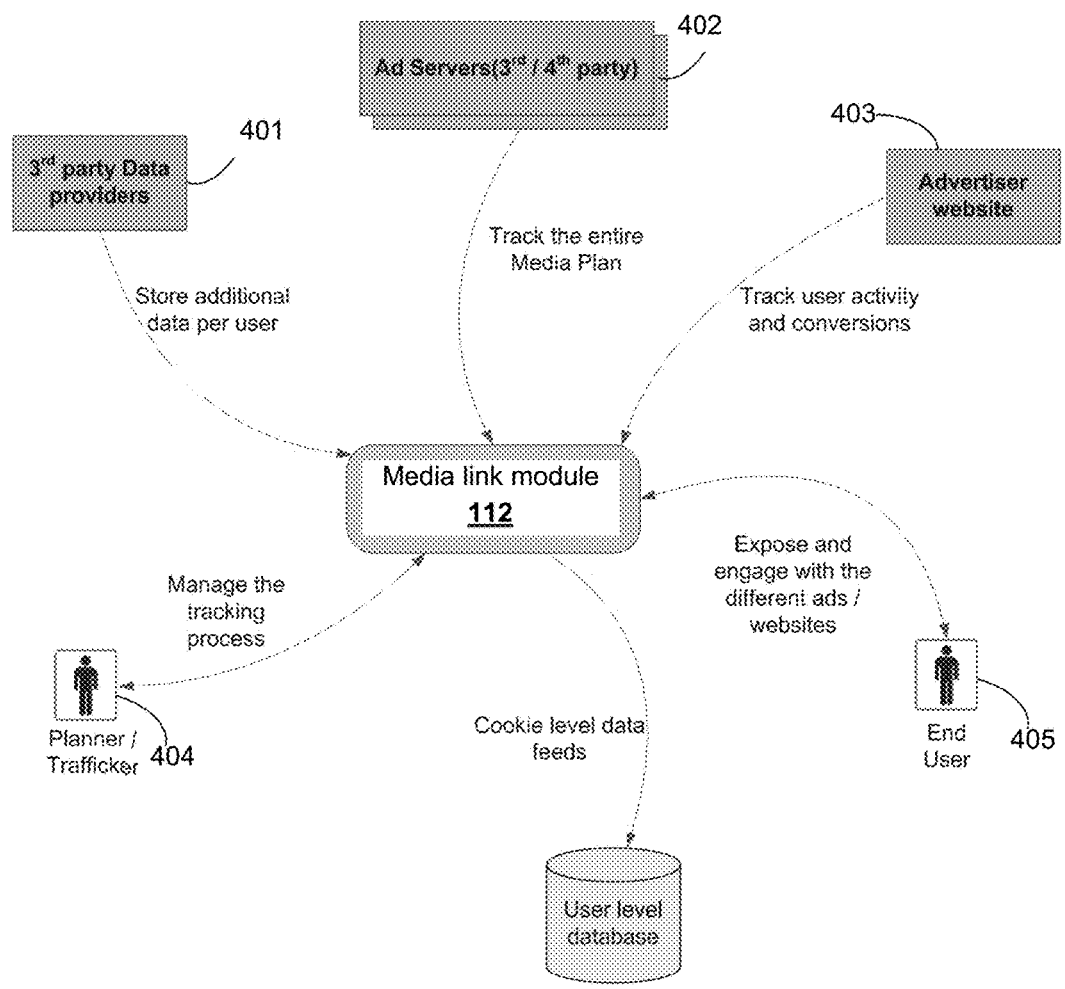
FIG. 4 is a diagram illustrating the operation of the media-link module according to an embodiment.

The operation of the media link module 112 is further described in FIG. 4. The media link module 112 can interface with a plurality of advertising media platforms 401 through 405. As illustrated in FIG. 4, these platforms include third party data providers 401, ad servers 402, advertiser websites 403, media planners 404, and end-users 405. For example, the ad servers 402 may include social network channels (e.g., Facebook®), ad-serving serving companies, and the like. The advertiser websites 403 are often websites accessible through a landing page. Users can reach advertiser websites 403 upon, e.g., clicking an advertisement displayed on a publisher website. The third party data providers 401 are systems of companies that collect and share information about users surfing the web. The media planners 404 can control, set, or configure the operation of the media link module 112. In an embodiment, media planners 404 also have access to the unified user-level data and any type of data generated and/or aggregated by the media link module 112.

In an embodiment, the media link module 112 is configured to perform a unified tracking process in user-level data from the different ad servers 402 and advertiser websites 403 are tracked and combined in a unified user-level data. The media link module 112 can track and analyze user-level data in any format provided by the various ad servers 402 and advertiser websites 403 to generate the unified user-level data. In an embodiment, the user-level data tracked by the media link module 112 includes conversion tags. The conversion tags may be propriety tags. As will be discussed in detail below, the conversion tags allow the media link module 112 to track post-impression and post-click conversions on the advertiser websites 403.

The tracking of user level data is performed at different granularities for different platforms 402 and 403. For the ad servers 402, the entire media plan is tracked. As noted above, the media plan is designed to find the specific combination of media to best achieve the marketing campaign objectives. For the advertiser website 403, a user activity and conversions are tracked. It should be noted that in both cases user-level data gathered or retrieved from the data providers 401, ad server 402, and/or advertiser websites 403 are analyzed. Each instance of a user-level data is referred to as event. Typically, user-level data as received by these platforms include one or more of the following fields: a timestamp, a user ID, an IP address associated with a client device of the user, a user agent (e.g., web browser type), and an event parameter. Each platform has its unique representation of the user-level data and a particular way to code the userID.

For example, if the ad-servers are Facebook® and Google® and the advertiser website is Nike®, their respective user-level data is $ULD_1$, $ULD_2$, and $ULD_3$, where $ULD_1$, $ULD_2$, and $ULD_3$ represent different data for the same user. In order to provide consistent user-level data that can be mapped or associated to the particular user, the media-link module 112 unifies $ULD_1$, $ULD_2$, and $ULD_3$, into a unified user-level identifier ($ULD_G$) which is a function of the data received from the different platform. That is:

$$UDL_G = f\{ULD_1, ULD_2, \text{and } ULD_3\}$$

It should be noted the $UDL_G$ cannot be recognized by the various platforms, as it does not comply with their format. The process for unifying the user-level data received from different sources is described below with reference to FIG. 5.

In an embodiment, the unified user-level data is generated per user (identified by a user ID) per session. A session is a predefined tracking period of time (e.g., 10 minutes). The generated unified user-level data for all users are saved in the database 116 or any storage device.

Figure 5:
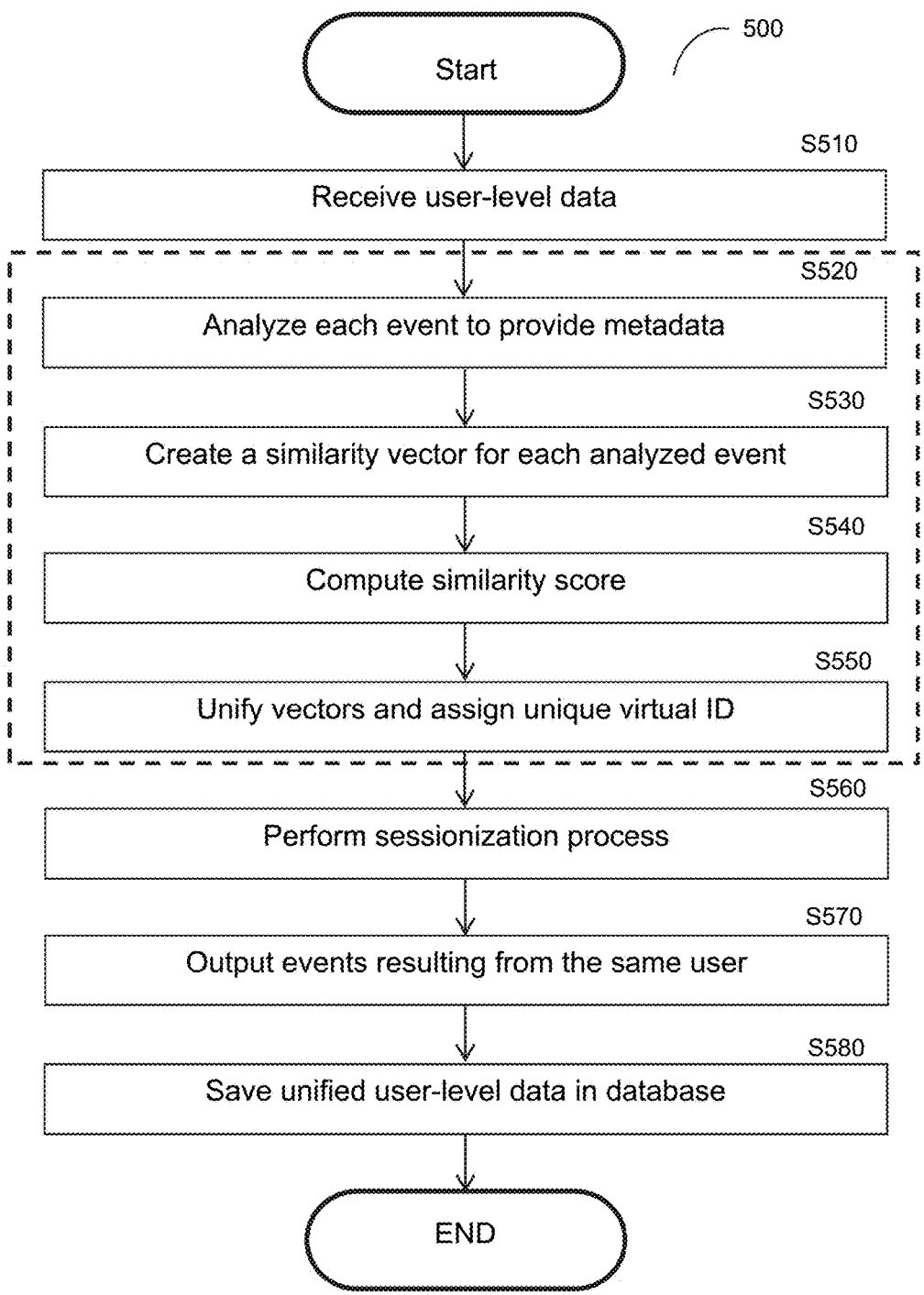
FIG. 5 is a flowchart illustrating a method for generating unified user level data according to one embodiment.

FIG. 5 is an exemplary and non-limiting flowchart 500 illustrating a method for generating a unified user-level data according to one embodiment. At S510, user-level data are received from a plurality of media platforms. The format and representations of the user-level data is different from one platform to another. In an embodiment, the user-level data includes a conversation tag. Each instance of user-level data is referred to an event that may be generated for any serving of an online advertisement (or any media asset), an interaction of a user with the online advertisement, and so on. It should be noted that the received events are respective of different users. A user-level data event typically includes a timestamp (e.g., 17/Oct 18:01:30), a user ID which is a sequence of charterers (e.g., de305d54-75b4), an IP address of the user device, a user agent, and at least one event parameter. Such parameters may define any information related to the location of the online advertisement (e.g., contact us page) or action performed by the user.

At S520 through S550 a process to detect all events related to the same user is performed. Specifically, for each received event, at S520, each event is analyzed to provide metadata on each event. For example, the IP address designated in each received event is decoded to identify the geographical location of the user, the user agent is decoded to determine the browser type, operating system time, and so on. In an embodiment, third party data providers 401 are queried to obtain additional information.

At S530, a similarity vector is created for each analyzed event. The vector includes the data contained in the event and the additional metadata. In an exemplary embodiment, a similarly vector may include the data fields F1, F2, . . . , FN, each such field containing a piece of data from the received event or the metadata. For example, F1 may include the timestamp, F2 may include the IP address, and F3 the determined geographical location.

At S540, a similarity score is computed by comparing generated similarity vectors to each other. The similarity score may be a weighted sum computed over data fields of two or more vectors. For example, an operation system type may have a lower weight as millions of users can use the same operating system (e.g., iOS®), an IP address may have a higher weight as two or more users may not have the same IP address at the same time frame, and a timestamp may have a lower weight as the same user is not likely to access the same advertisement at the exact same time. That is, in an exemplary and non-limiting embodiment, the weight determines a certain value that a respective field, if matched between two or more vectors, will indicate on similarity of the vector. According to this embodiment, a high similarity score indicates on events (vectors) of the same user.

At S550, similarity vectors having a similarity score above a predefined threshold are unified and a unique virtual user identifier (ID) is assigned. In an embodiment, the assigned user identifier is a Globally Unique Identifier (GUID). The GUID is unique reference number used as an identifier, typically containing 32-hexadecimal digits.

At S560, a sessionization process is performed to detect all events that do not belong to a current session. As noted above, a session is a predefined time period. This step is performed as some received events may be a continuation of the previous sessions. In an embodiment, S560 includes determining a session period (e.g., 5 minutes). Then, all events belonging to the same unified user-level data are grouped by their GUID (or the virtual ID). The timestamp of each event is matched to the current time to determine if the elapsed time is more than one session period. If so, the event belongs to a previous session; otherwise, the event is of the current session and a session identified is increased.

At S570, events resulting from the same user are output organized by their sessions' IDs. In an embodiment, the unified user-level data of a user may include the respective session IDs. At S580, the unified user-level data generated for each user is saved, for example, in the database 316.

Figure 6:
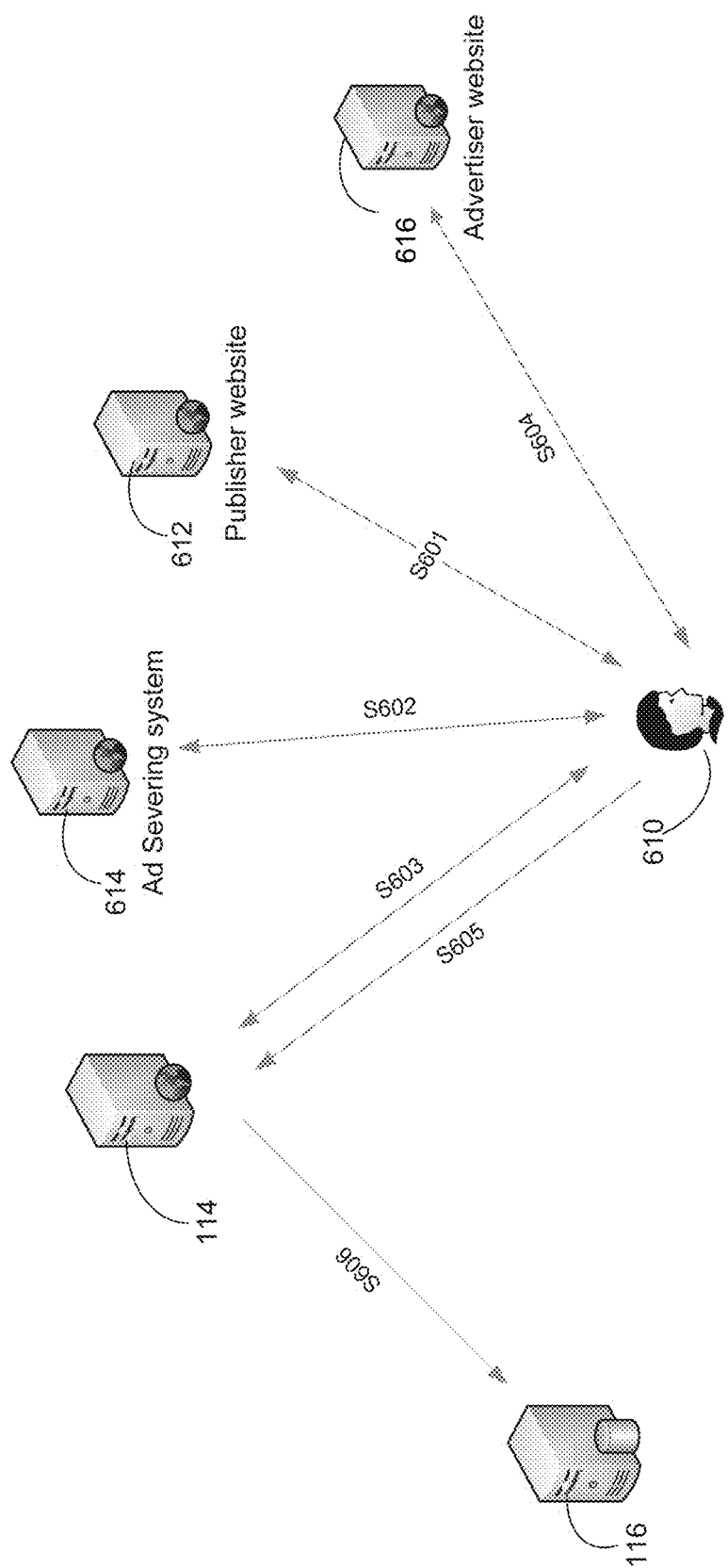
FIG. 6 is a diagram illustrating tracking post-impression and post-click conversion according to one embodiment.

FIG. 6 illustrates the process for tracking post-impression and post-click conversion according to an exemplary embodiment. At S601, a user 610 (e.g., by means of a web browser installed on the client device) accesses a publisher webpage hosted in a publisher web site 612. In an embodiment, this webpage contains an advertisement placement being tracked by the media link module 112 by means of the unified tracking server 114.

At S602 the user's browser calls an advertisement server 614 and displays the advertisement. At S603, the unified tracking server 114 records the impression (a measure of the number of times the advertisement is displayed on the browser of the user 610). At S604, as the user clicks on the advertisement, the browser navigates to an advertiser website 616. The advertiser website 616 contains conversion tags assigned by the media link module 112.

At S605, the browser of the end-user 610 calls the unified tracking server 114 in order to count the conversion as reported by the conversion tags included in the advertiser website 616. The format of the conversion tag is discussed below. In order to track post-impression and post-click conversions on the advertiser's website 616, the unified tracking server 114 is required to embed conversion tags. In one exemplary embodiment, the proprietary conversion tags use the same client's root domain name which allows the ability to show a full path to conversion including all advertisements from all the different vendors (due to the fact that they will share the same top level domain).

At S606, the unified tracking server 114 in the media link module 112 stores the tracking user-level data in the database 116. In an embodiment, the tracking user-level data is a data structure that contains information about a user associated with a unique virtual user identifier. In an embodiment, the tracking user-level data may be in a format of the unified user-level data as described above, where the virtual user identifier is a GUID.

In an embodiment, in order to tag end-users (ad viewers) globally across different advertising platforms, a new domain name and data structure are disclosed. In one embodiment, the tracking domain name included in the media link module 112 conversion tag will issue to a user a new domain name which is a sub-domain of the respective client domain name. A client may be, but is not limited to, an advertiser, a marketer, and an advertisement agency.

The disclosed data structure includes a user ID cookie, which contains a unique identifier of the end-user. In one embodiment, the structure of the user-level data structure utilized by media link is as defined as follows:

Name:
Value: Globally unique identifier (GUID)
Path: /
Expires: 31-Dec.-2040 00:00:00 GMT It should be noted that the cookie is added on the top level domain (.acme.com), thereby the data can be shared at the sub-domain level.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for unifying user-level data across a plurality of media platforms, comprising:
   receiving user-level data events from the plurality of media platforms, wherein each user-level data event relates to at least one online advertisement viewed by a plurality of users and each user-level data event includes at least a conversion tag using a same client domain name, wherein the conversion tag allows unique track post-impression and post-click conversion performed by a user;
   processing the received user-level data events to detect a group of user-level data events related to the same user of the plurality of users by:
      analyzing each of the received user-level data events to generate additional metadata;
      for each of the received user-level data events, generating a respective similarity vector containing data pieces;
      comparing the generated similarity vectors; and
      computing a similarity score based on the comparisons;
   combining user-level data from each group of user-level data events related to the same user;
   assigning a unique user identifier to the combined user-level data to result in a unified user-level data related to a particular user; and
   storing the unified user-level data in a database, thereby providing, for each user, consistent user-level data including at least interaction of the respective user across the plurality of media platforms;
   performing a sessionization process to detect all user-level data events in each group of user-level data events that do not belong to a current session; and
   assigning a session identifier for each user-level data event in the group of user-level data events based on the sessionization process.

2. The method of claim 1, wherein the respective similarity vector containing data pieces from at least one of: information contained in the respective user-level data event and the metadata.

3. The method of claim 2, wherein the group of user-level data events includes user-level data events having a respective similarity score over a predefined threshold.

4. The method of claim 1, wherein each of the user-level data events includes at least one of: a timestamp, a user agent, an internet protocol (IP) address of a user device, and at least one event parameter.

5. The method of claim 1, wherein the unique user identifier is at least a global user identifier.

6. The method of claim 1, wherein each of the plurality of media platform is any one of: an ad-serving system of an ad-serving company, a social media website, an advertiser website, and a content publisher.

7. A non-transitory computer readable medium having stored thereon instructions for causing one or more processing units to execute a method comprising:
   receiving user-level data events from the plurality of media platforms, wherein each user-level data event relates to at least one online advertisement viewed by a plurality of users and each user-level data event includes at least a conversion tag using a same client domain name, wherein the conversion tag allows unique track post-impression and post-click conversion performed by a user;
   analyzing each of the received user-level data events to generate additional metadata;
   for each of the received user-level data events, generating a respective similarity vector containing data pieces;
   comparing the generated similarity vectors; and
   computing a similarity score based on the comparisons;
   processing the received user-level data events to detect a group of user-level data events related to the same user of the plurality of users;
   combining user-level data from each group of user-level data events related to the same user;
   assigning a unique user identifier to the combined user-level data to result in a unified user-level data related to a particular user; and
   storing the unified user-level data in a database, thereby providing, for each user, consistent user-level data including at least interaction of the respective user across the plurality of media platforms;
   performing a sessionization process to detect all user-level data events in each group of user-level data events that do not belong to a current session; and
   assigning a session identifier for each user-level data event in the group of user-level data events based on the sessionization process.

8. A system for unifying user-level data across a plurality of media platforms, comprising:
   a processor; and
   a memory, the memory containing instructions that, when executed by the processor, configure the system to:
   receive user-level data events from the plurality of media platforms, wherein each user-level data event relates to at least one online advertisement viewed by a plurality of users and each user-level data event includes at least a conversion tag using a same client domain name, wherein the conversion tag allows unique track post-impression and post-click conversion performed by a user;
   process the received user-level data events to detect a group of user-level data events related to the same user of the plurality of users
   analyze each of the received user-level data events to generate additional metadata;

for each of the received user-level data events, generating a respective similarity vector containing data pieces;
comparing the generated similarity vectors; and
computing a similarity score based on the comparisons;
combine user-level data from each group of user-level data events related to the same user;
assign a unique user identifier to the combined user-level data to result in a unified user-level data related to a particular user; and
store the unified user-level data in a database, thereby providing, for each user, consistent user-level data including at least interaction of the respective user across the plurality of media platforms
perform a sessionization process to detect all user-level data events in each group of user-level data events that do not belong to a current session; and
assign a session identifier for each user-level data event in the group of user-level data events based on the sessionization process.

9. The system of claim 8, wherein the respective similarity vector containing data pieces from at least one of: information contained in the respective user-level data event and the metadata.

10. The system of claim 9, wherein the group of user-level data events include user-level data events having a respective similarity score over a predefined threshold.

11. The system of claim 8, wherein each of the user-level data events includes at least one of: a timestamp, a user agent, an internet protocol (IP) address of a user device, and at least one event parameter.

12. The system of claim 8, wherein the unique user identifier is at least a global user identifier.

13. The system of claim 8, wherein each of the plurality of media platform is any one of: an ad-serving system of an ad-serving company, a social media website, an advertiser website, and a content publisher.

* * * * *